United States Patent
Oki et al.

(10) Patent No.: US 9,511,784 B2
(45) Date of Patent: Dec. 6, 2016

(54) IN-CAR INFORMATION DISPLAY SYSTEM AND POWER SUPPLY METHOD

(75) Inventors: Masao Oki, Chiyoda-ku (JP); Satoru Ohashi, Chiyoda-ku (JP); Hideo Sawazaki, Kobe (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 137 days.

(21) Appl. No.: 14/381,073

(22) PCT Filed: Feb. 28, 2012

(86) PCT No.: PCT/JP2012/055001
§ 371 (c)(1),
(2), (4) Date: Aug. 26, 2014

(87) PCT Pub. No.: WO2013/128585
PCT Pub. Date: Sep. 6, 2013

(65) Prior Publication Data
US 2015/0045996 A1 Feb. 12, 2015

(51) Int. Cl.
*B61L 25/00* (2006.01)
*G01C 21/00* (2006.01)
(Continued)

(52) U.S. Cl.
CPC ............... *B61L 25/00* (2013.01); *B60L 1/003* (2013.01); *B60L 3/003* (2013.01); *B60L 3/12* (2013.01);
(Continued)

(58) Field of Classification Search
CPC ............ B61L 25/00; G01C 21/00; B60L 9/24; B60L 13/00
See application file for complete search history.

(56) References Cited

U.S. PATENT DOCUMENTS 5,493,685 A * 2/1996 Zenda ................... G06F 1/3218
 713/321
6,597,339 B1 * 7/2003 Ogawa ................. G09G 3/3406
 345/102

(Continued)

FOREIGN PATENT DOCUMENTS

EP 1903800 A1 3/2008
EP 2340957 A1 7/2011
(Continued)

OTHER PUBLICATIONS

International Search Report (PCT/ISA/210) mailed on May 29, 2012, by the Japanese Patent Office as the International Searching Authority for International Application No. PCT/JP2012/055001.
(Continued)

*Primary Examiner* — Tuan C. To
(74) *Attorney, Agent, or Firm* — Buchanan Ingersoll & Rooney PC

(57) ABSTRACT

An in-car information display system includes a power storage device including a storage battery charged with direct-current power obtained by converting electric power from an overhead wire, a plurality of display devices that operate by receiving supply of direct-current power from the power storage device and provide a guidance display related to a service of a train to passengers, and a terminal device that operates by receiving the supply of the direct-current power from the power storage device and delivers to the display devices information for guidance display that is information used for the guidance display. The power storage device switches a power supply operation to the display devices according to a residual capacity of the storage battery and reduces a total amount of electric power supplied to each of the display devices.

18 Claims, 7 Drawing Sheets

(51) Int. Cl.
*B60L 1/00* (2006.01)
*B60L 3/00* (2006.01)
*B60L 7/12* (2006.01)
*B60L 9/04* (2006.01)
*B60L 11/18* (2006.01)
*B60L 3/12* (2006.01)
*B61L 15/00* (2006.01)

(52) U.S. Cl.
CPC .. *B60L 7/12* (2013.01); *B60L 9/04* (2013.01); *B60L 11/1805* (2013.01); *B60L 11/1861* (2013.01); *B61L 15/009* (2013.01); *B61L 15/0072* (2013.01); *B61L 15/0081* (2013.01); *G01C 21/00* (2013.01); *B60L 2200/26* (2013.01); *B60L 2210/10* (2013.01); *B60L 2210/20* (2013.01); *B60L 2240/80* (2013.01); *B60L 2250/16* (2013.01); *B61L 15/0036* (2013.01); *Y02T 10/705* (2013.01); *Y02T 10/7005* (2013.01); *Y02T 10/7044* (2013.01); *Y02T 10/725* (2013.01); *Y02T 10/7216* (2013.01)

(56) References Cited

U.S. PATENT DOCUMENTS

| | | | |
|---|---|---|---|
| 8,013,469 B2* | 9/2011 | Masselus | B60L 1/003 104/88.04 |
| 8,543,275 B1* | 9/2013 | Koga | B60L 7/10 318/139 |
| 8,729,728 B2* | 5/2014 | Bavard | B60M 3/06 105/49 |
| 8,730,230 B2* | 5/2014 | Shiuan | G06F 3/1431 345/1.1 |
| 8,836,161 B2* | 9/2014 | Nogi | B60M 3/04 191/50 |
| 2004/0216636 A1* | 11/2004 | Emori | B60L 9/18 105/26.05 |
| 2005/0209747 A1 | 9/2005 | Yakes et al. | |
| 2007/0288131 A1* | 12/2007 | Yakes | B60K 1/02 701/22 |
| 2008/0053721 A1 | 3/2008 | Hoshiba et al. | |
| 2008/0295138 A1* | 11/2008 | Emoto | B61D 49/00 725/81 |
| 2009/0023482 A1 | 1/2009 | Koura et al. | |
| 2011/0095604 A1* | 4/2011 | Bavard | B60M 3/06 307/12 |
| 2011/0121952 A1* | 5/2011 | Bonicatto | H04B 3/54 340/12.32 |
| 2012/0000739 A1* | 1/2012 | Nogi | B60M 3/04 191/50 |
| 2012/0019058 A1 | 1/2012 | Goodermuth et al. | |
| 2012/0173055 A1* | 7/2012 | Yamamoto | B60L 9/00 701/20 |

FOREIGN PATENT DOCUMENTS

| | | |
|---|---|---|
| JP | 2-079196 A | 3/1990 |
| JP | 7-049661 A | 2/1995 |
| JP | 7-020684 U | 4/1995 |
| JP | 11-005534 A | 1/1999 |
| JP | 2002-127905 A | 5/2002 |
| JP | 2003-285737 A | 10/2003 |
| JP | 2006-094689 A | 4/2006 |
| JP | 2006-287898 A | 10/2006 |
| JP | 2007-030763 A | 2/2007 |
| JP | 2008-113347 A | 5/2008 |
| JP | 2008-302776 A | 12/2008 |
| JP | 2009-015239 A | 1/2009 |
| JP | 4884569 B1 | 2/2012 |
| KR | 10-2005-0106599 A | 11/2005 |
| KR | 10-2007-0064338 A | 6/2007 |

OTHER PUBLICATIONS

Written Opinion (PCT/ISA/237) mailed on May 29, 2012, by the Japanese Patent Office as the International Searching Authority for International Application No. PCT/JP2012/055001.

Office Action (Reason for Rejection) issued on Oct. 27, 2015 by the Korean Intellectual Property Office in corresponding Korean Patent Application No. 10-2014-7022992 and an English translation thereof. (10 pgs).

Extended European Search Report, dated Sep. 4, 2015, issued in EP 12869871.9 (9 pages).

Office Action (Reasons for Rejection) issued on Feb. 1, 2016, by the Korean Intellectual Property Office in corresponding Korean Patent Application No. 10-2014-7022992 and partial English translation of the Office Action. (6 pages).

* cited by examiner

TO DISPLAY DEVICE

IN-CAR INFORMATION DISPLAY SYSTEM AND POWER SUPPLY METHOD

FIELD

The present invention relates to an in-car information display system that notifies passengers of information such as advertisements and service statuses in a car of a train.

BACKGROUND

In recent years, in a railway car, in general, a display device such as an LCD display is provided near a door in the car and various kinds of information such as service statuses and advertisements are provided to passengers using the display device. Further, systems that perform not only information provision by simple texts or still images but also information provision by videos have been spread (see, for example, Patent Literatures 1 and 2). There is also known a configuration in which two LCD displays are set as a pair in a lintel above a door and one is used for information provision (guidance display) concerning service statuses and the other is used for provision of advertisement information.

Patent Literature 3 describes an in-train broadcast delivery system that delivers broadcast programs of television to a train. In the in-train broadcast delivery system, a signal of a broadcast received by an antenna is relayed among transmission devices set in cars and forming a ring-type network and is multicast to user terminals from the transmission devices. Consequently, a reduction in a line capacity necessary for the delivery of the broadcast signal, improvement of failure resistance, and the like are realized.

CITATION LIST

Patent Literature

Patent Literature 1: Japanese Patent Application Laid-Open No. 2002-127905
Patent Literature 2: Japanese Patent Application Laid-Open No. 2009-015239
Patent Literature 3: Japanese Patent Application Laid-Open No. 2008-113347

SUMMARY

Technical Problem

In a railway car, in addition to normal guidance display, it is also possible to, when service suspension, a delay, or the like of a train occurs, cause display devices in the car to display information concerning the service suspension, the delay, or the like and provide passengers with the information. However, when, for example, a natural disaster, an accident, or the like occurs, it is likely that power supply from an overhead wire is stopped. Therefore, it is desired to realize a system that can continue information provision even when a failure such as the stop of the power supply from the overhead wire occurs.

The present invention has been devised in view of the above, and it is an object of the present invention to provide an in-car information display system and a power supply method capable of providing passengers with necessary information even when a failure occurs in a power system of a car, for example, when power supply cannot be received from an overhead wire.

Solution to Problem

The present invention is directed to an in-car information display system that achieves the object. The in-car information display system includes a power storage device including a storage battery charged with direct-current power obtained by converting electric power from an overhead wire; a plurality of display devices that operate by receiving supply of direct-current power from the power storage device and provide a guidance display related to a service of a train to passengers; and a terminal device that operates by receiving the supply of the direct-current power from the power storage device and delivers to the display devices information for guidance display that is information used for the guidance display. The power storage device switches a power supply operation to the display devices according to a residual capacity of the storage battery and reduces a total amount of electric power supplied to each of the display devices.

Advantageous Effects of Invention

According to the present invention, the terminal device of each car and the display devices, which directly receive information from the terminal device, operate by receiving the power supply from the power storage device in the car. Therefore, there is an effect that it is possible to continue the guidance display even when the power supply from the overhead wire is stopped, a current collector breaks down, or a power converter, which converts electric power supplied from the overhead wire into electric power for a display device operation, breaks down.

There is also an effect that it is possible to continue the guidance display for a long time because the total amount of the electric power supplied to each display device is adjusted according to a charge amount (a battery residual amount) accumulated in the power storage device.

DESCRIPTION OF EMBODIMENTS

Embodiments of an in-car information display system and a power supply method according to the present invention are explained in detail below with reference to the drawings. Note that the present invention is not limited by the embodiments.

First Embodiment

Explanation of an Overall Configuration

Figure 1:
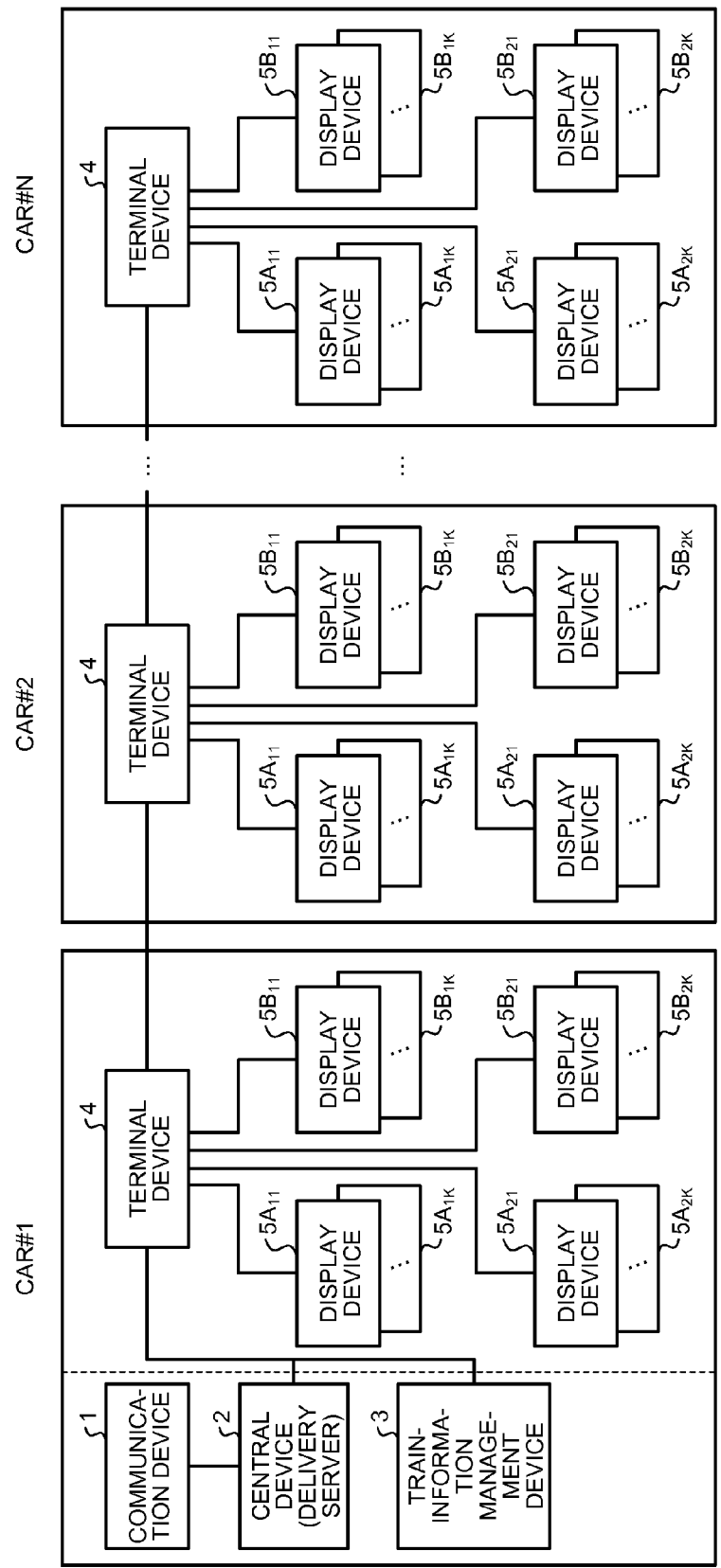
FIG. 1 is a diagram of an example of the overall configuration of an in-car information display system according to the present invention.

FIG. 1 is a diagram of an example of the overall configuration of an in-car information display system according to the present invention. As shown in the figure, the in-car information display system is set in a train in which a car #1 to a car #N are coupled. In the cars, as common components, terminal devices 4 and a plurality of display devices $5A_{11}$ to $5A_{1K}$, $5A_{21}$ to $5A_{2K}$, $5B_{11}$ to $5B_{1K}$, and $5B_{21}$ to $5B_{2K}$ are set. For example, in the car #1, which is a head car, a communication device 1, a central device (a delivery server) 2, and a train-information management device 3 are further set. Note that the communication device 1, the central device 2, and the train-information management device 3 can be set in another car rather than the car #1 or can be set in different cars.

In FIG. 1, the communication device 1 transmits data to and receives data from a ground station (not shown in the figure) set in a station or the like. The central device 2 delivers data acquired from the ground station via the communication device 1 and moving image data stored in advance to the terminal devices 4 in the cars. The train-information management device 3 performs collection and management of train information explained below.

The terminal devices 4 set in the cars are connected to one another via a transmission line. The terminal device 4 of the car, in which the central device 2 is set, is connected to the central device 2 and the train-information management device 3. When the terminal device 4 receives data from the central device 2, the terminal device 4 retains the data and transfers the data to the other terminal devices 4. When the terminal device 4 set in the car different from the car in which the central device 2 is set receives data output from the central device 2 and relayed by the other terminals 4, if the other terminal devices 4 adjacent to the terminal device 4 is present on a transmission route, the terminal device 4 transfers the received data to the other terminal devices 4. Details of the transmission route are separately explained.

The display devices (the display devices $5A_{11}$ to $5A_{1K}$, $5A_{21}$ to $5A_{2K}$, $5B_{11}$ to $5B_{1K}$, and $5B_{21}$ to $5B_{2K}$) operate by receiving supply of direct-current power or alternating-current power. The display devices are set on wall surfaces in the car (e.g., in lintels above doors). The display devices display, on the basis of an instruction or the like from the terminal devices 4, guidance based on service information, emergency information, and the like of the train, an advertisement formed by a still image or a moving image (a video), and the like. In this embodiment, it is assumed that two display devices are treated as a pair and are set side by side and one of the pair is used as a display device for notifying passengers of the service information, the emergency information, and the like of the train and the other is used for advertisement display.

In the following explanation, display devices 5A ($5A_{11}$ to $5A_{1K}$ and $5A_{21}$ to $5A_{2K}$) are display devices for display of guidance and display devices 5B ($5B_{11}$ to $5B_{1K}$ and $5B_{21}$ to $5B_{2K}$) are used as display devices for advertisements. The display devices $5A_{11}$ to $5A_{1K}$ and $5B_{11}$ to $5B_{1k}$ are display devices set on one wall surface in the car and the display devices $5A_{21}$ to $5A_{2K}$ and $5B_{21}$ to $5B_{2K}$ are display devices set on the other wall surface in the car. The description "display device 5" indicates all of the display devices $5A_{11}$ to $5A_{1K}$, $5A_{21}$ to $5A_{2K}$, $5B_{11}$ to $5B_{1K}$, and $5B_{21}$ to $5B_{2K}$. The description "display devices 5A" indicates all of the display devices $5A_{11}$ to $5A_{1K}$ and $5A_{21}$ to $5A_{2K}$ (the display devices for guidance display). The description "display devices 5B" indicates all of the display devices $5B_{11}$ to $5B_{1K}$ and $5B_{21}$ to $5B_{2K}$ (the display devices for advertisement display).

Figure 2:
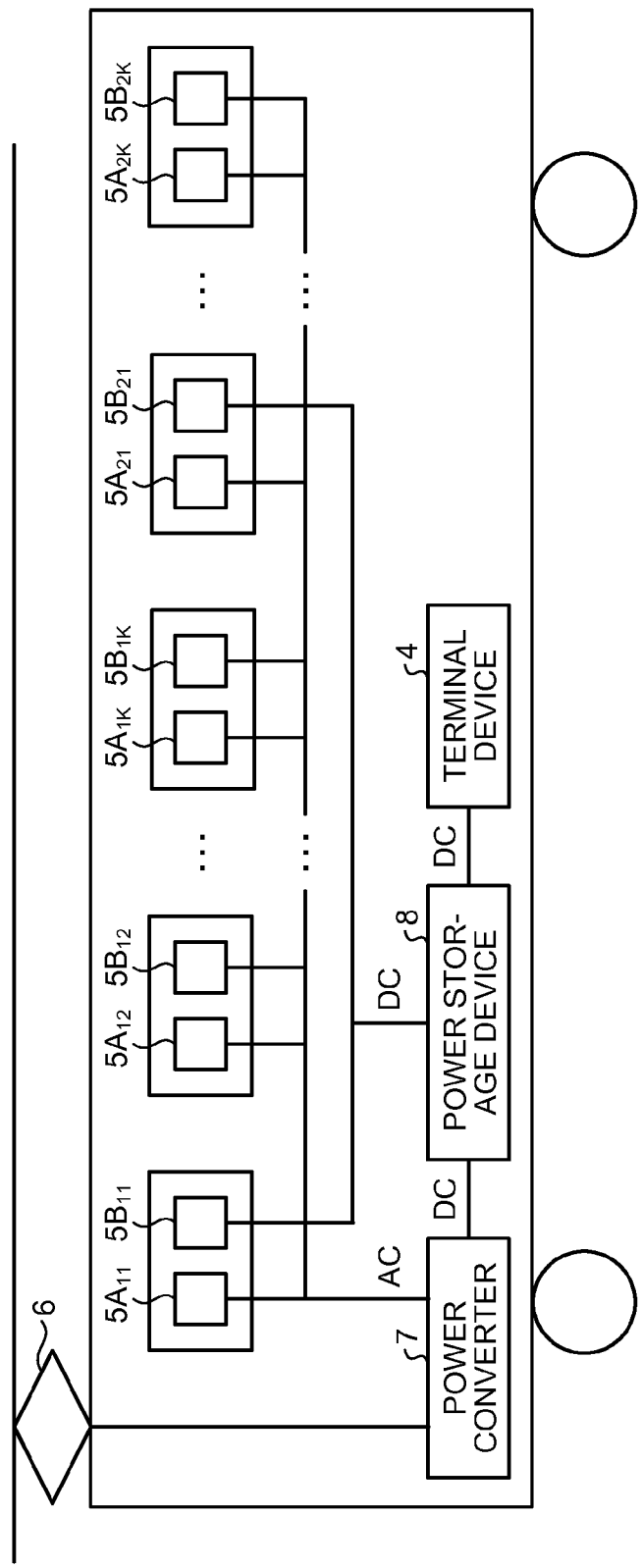
FIG. 2 is a diagram of an example of a power supply route to a terminal device and display devices.

FIG. 2 is a diagram of an example of a power supply route to the terminal device 4 and the display devices 5 set in one car. The car shown in the figure includes the terminal device 4, a plurality of display devices 5, a current collector 6, a power converter 7, and a power storage device 8 (e.g., a battery). In the car shown in FIG. 2, the power converter 7 receives supply of electric power from an overhead wire via the current collector 6 such as a pantograph and converts the electric power into direct-current power and alternating-current power having a desired voltage. The direct-current power is used as electric power for charging of the power storage device 8. The alternating-current power is used as electric power for operation of all of the display devices 5B and a part of the display devices 5A. The terminal device 4 and a part of the display devices 5A (the display devices 5A that do not receive the supply of the alternating-current power from the power converter 7) operate by receiving the supply of the direct-current power from the power storage device 8. The power supply route is the same when the electric power supplied from the overhead wire is the direct-current power and when the electric power supplied from the overhead wire is the alternating-current power. The configuration (the operation) of the power converter 7 is only different. Note that, when the power supply from the power converter 7 is stopped because of a power failure of the overhead wire or a failure of the power converter 7, if the terminal device 4 can detect this state, the terminal device 4 can directly receive the power supply from the power converter 7 at normal time and operate with the supplied power from the power storage device 8 only when an abnormality occurs.

In FIG. 2, the example of the power supply route in the car (other than the car #1 shown in FIG. 1) not including the communication device 1, the central device 2, and the train-information management device 3 is shown. However, a power supply route to the terminal device 4 and the display devices 5 in the car #1 is the same. The communication device 1, the central device 2, and the train-information management device 3 operate with the direct-current power supplied from the power storage device 8. The power storage device 8 is configured to supply electric power to the terminal devices 4 and a part of the display devices 5A of the cars. Therefore, even when the current collector 6 and the power converter 7 break down and even when the power supply from the overhead wire is stopped, it is possible to continue provision of guidance information (guidance display) by using the display devices 5A that operate with the direct-current power. Only a part of the display devices 5A is configured to be actuated by the electric power supplied from the power storage device 8. Therefore, it is possible to reduce power consumption to a necessary minimum after the power storage device 8 cannot be charged because of a failure or the like and suppress exhaustion of the power storage device 8. The number of the display devices 5A actuated by the electric power supplied from the power storage device 8 is determined on the basis of, for example, a storage capacity of the power storage device 8. Conversely, the storage capacity of the mounted power storage device 8 can be determined on the basis of the number of display devices 5A actuated by the electric power supplied from the power storage device 8.

In FIG. 2, the power supply route in the car including the current collector 6, the power converter 7, and the power storage device 8 is shown. The current collector 6, the power converter 7, and the power storage device 8 can be set in a part of the cars rather than being set in the respective cars. When the current collector 6, the power converter 7, and the power storage device 8 are set in a part of the cars, the terminal device 4 and a part of the display devices 5A of the car, in which the power storage device 8 is not set, operate by receiving the supply of the direct-current power from the power storage device 8 set in another car. When the car includes a power storage device for electric motor (motor) driving and a power storage device for auxiliary machine driving, the power storage devices can be used as the power storage device 8.

Figure 3:
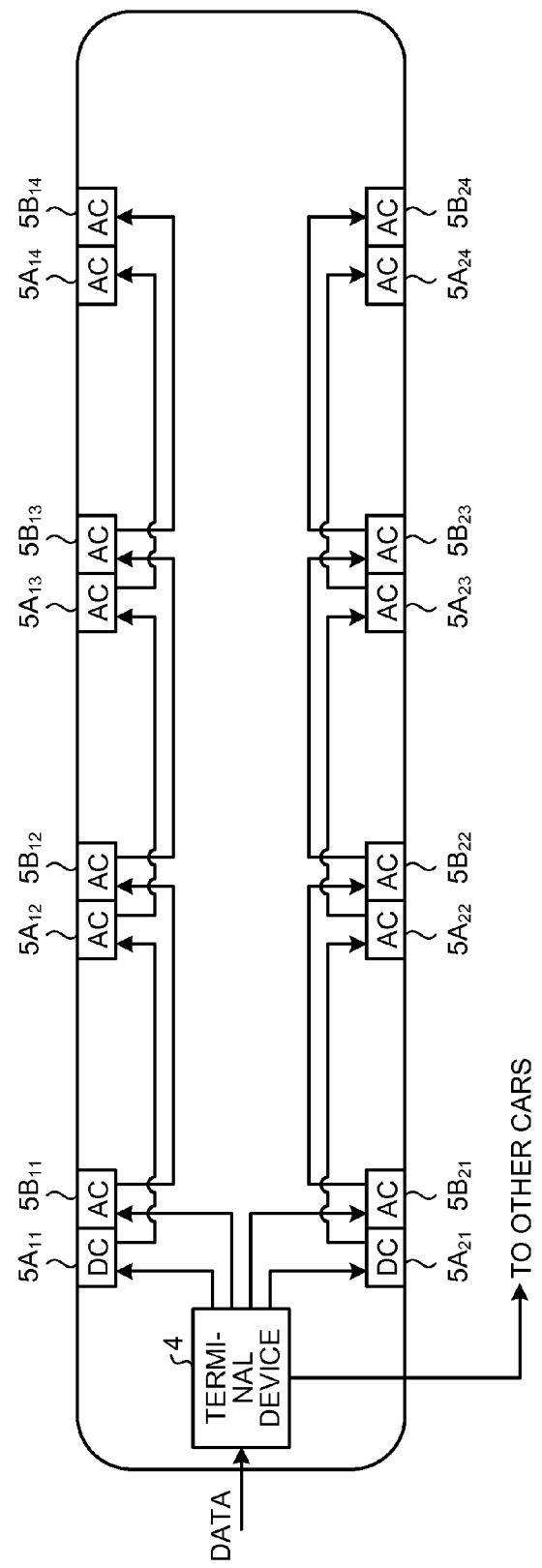
FIG. 3 is a diagram of an example of an information transmission route from the terminal device to the display devices in a car.

FIG. 3 is a diagram of an example of an information transmission route from the terminal device 4 to the display devices 5 in the car. Information transmitted from the terminal device 4 to the display devices 5 includes information used for guidance display (hereinafter described as information for guidance display), information used for advertisement display (hereinafter described as information for advertisement display), and control information such as an instruction for the guidance display and an instruction for the advertisement display. In FIG. 3, the display devices marked with DC are display devices that operate by receiving the supply of the direct-current power from the power storage device 8 shown in FIG. 2. The display devices marked with AC are display devices that operate by receiving the supply of the alternating-current power from the power converter 7 shown in FIG. 2.

The information for guidance display includes, for example, information concerning a route on which the train travels (information concerning stations on the route, a schedule, information concerning stops for each of train types, etc.), service information on the route (information concerning a service delay and a service stop that occur on the route on which the own train is traveling and neighboring routes, etc.), information concerning the owe train (information concerning a position where the train is traveling, etc.), and information concerning emergency guidance (guidance information concerning an escape route, etc.). The information for guidance display is information that has a relatively small volume and can be individually retained by the respective display devices 5A.

The information for advertisement display is a large-volume data such as a moving image and is information that is hard to be individually retained by the respective display devices 5B.

The control information is information for instructing content to be displayed on the display devices 5. The display devices 5 display, to the passengers, the content indicated by the control information received from the terminal device 4 at timing indicated by the control information. The control information is classified into two kinds: control information for guidance display and control information for advertisement display. The terminal device 4 can generate different control information for each of the display devices 5 and transmit the control information to the display devices 5. Consequently, it is possible to provide the passengers with information having content different for each of the display devices 5. For example, it is possible to provide the passengers with simple information by displaying detailed facility guidance different for each of the display devices 5A according to the positions of the respective display devices 5A. It is possible to provide, by changing guidance of the respective display devices 5A during an abnormality or emergency of the train, the passengers with guidance (e.g., an evacuation route) adapted to an abnormal state.

Referring back to FIG. 3, in the in-car information display system in this embodiment, as shown in the figure, the display devices 5 in one car are classified into four groups according to uses and setting positions (whether the display devices 5 are display devices for guidance display or for advertisement display and on which wall surface of the car the display devices 5 are set). The terminal device 4 transmits information to a representative display device 5 in each group. The display devices 5 transfer the received information to the adjacent display devices 5 among the display devices in the same group.

In the example shown in FIG. 3, the terminal device 4 transmits the information for guidance display to the display devices $5A_{11}$ and $5A_{21}$ and transmits the information for advertisement display to the display devices $5B_{11}$ and $5B_{21}$. If the control information is the control information for guidance display, the terminal device 4 transmits the control information to the display devices $5A_{11}$ and $5A_{21}$. If the control information is the control information for advertisement display, the terminal device 4 transmits the control information to the display devices $5B_{11}$ and $5B_{21}$. The information for guidance display and the control information for guidance display are transferred in the order of the display device $5A_{11}$, the display device $5A_{12}$, the display device $5A_{13}$, and the display device $5A_{14}$ and the order of the display device $5A_{21}$, the display device $5A_{22}$, the display device $5A_{23}$, and the display device $5A_{24}$ and delivered to all the display devices 5A in the car. The information for advertisement display and the control information for advertisement display are transferred in the order of the display device $5B_{11}$, the display device $5B_{12}$, the display device $5B_{13}$, and the display device $5B_{14}$ and the order of the display device $5B_{21}$, the display device $5B_{22}$, the display device $5B_{23}$, and the display device $5B_{24}$ and delivered to all the display devices 5B in the car.

Among the display devices 5A, the display devices $5A_{11}$ and $5A_{21}$, which directly receive information from the terminal device 4, are display devices that operate by receiving the supply of the direct-current power from the power storage device 8. That is, the terminal device 4 directly transmits information to the display devices 5A operating with a direct-current power supply and the display device 5B paired with the display devices 5A. Consequently, even if the supply of the alternating-current power from the power converter 7 to the display devices 5 is stopped, the display devices 5A (in the example shown in FIG. 3, the display devices $5A_{11}$ and $5A_{21}$) operating with the direct-current power can perform a normal operation and can provide the passengers with the guidance display. Note that there can be provided, in each of the groups, a plurality of the display devices 5 operating with the direct-current power. In this case, the display devices 5 operating with the direct-current power directly receive information from the terminal device 4. The display devices 5 satisfy a relation in which the display devices 5 receive information transferred by the other display devices operating with the direct-current power. That is, all the display devices 5 operating with the direct-current power receive information earlier than all the display devices 5 operating with the alternating-current power.

Delivery order of information in the groups is not limited to the order shown in FIG. 3. For example, information from the terminal device 4 can be delivered to the display devices $5A_{12}$, $5A_{22}$, $5B_{12}$, and $5B_{22}$ first and transferred from the display devices to the adjacent display devices in the same group. The information from the terminal device 4 can be delivered to the display devices $5A_{11}$, $5A_{24}$, $5B_{11}$, and $5B_{24}$ first and transferred from the display devices to the adjacent display devices in the same group. Further, the display devices 5A (the display devices $5A_{11}$ and $5A_{24}$) set on a car end side can directly receive the information from the terminal device 4. Consequently, when the supply of the alternating-current power is stopped, it is highly likely that both of the passengers in the front and the passengers in the back of the car can check guidance display. It is possible to efficiently provide information. It goes without saying that the information delivery can be performed in order other than these kinds of order. However, in all the cases, the display devices 5A, which directly receive information from the terminal device 4, operate with the direct-current power from the power storage device 8.

Figure 4:
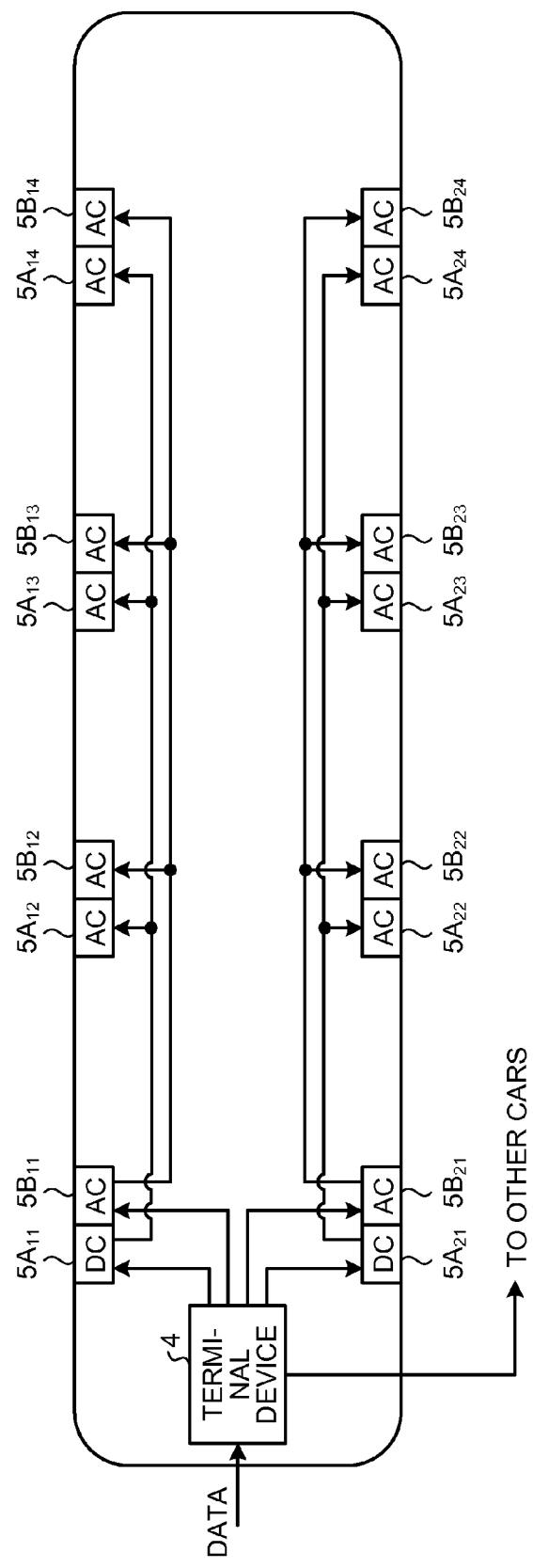
FIG. 4 is a diagram of an example of an information transmission route from the terminal device to the display devices in the car.

In FIG. 3, the example is shown in which the display devices in the groups transfer information to the adjacent display devices. However, as shown in FIG. 4, the display devices 5 (in an example shown in FIG. 4, the display devices $5A_{11}$, $5A_{21}$, $5B_{11}$, and $5B_{21}$), which directly receive information from the terminal device 4, can directly transmit information to all the other display devices 5 in the same group.

<Explanation of the Components>

The components shown in FIG. 1 are explained.

(Communication Device 1)

The communication device 1 performs communication with the ground station not shown in FIG. 1 and receives information delivered to the cars by the central device 2. The communication device 1 transmits information concerning the own train to the ground station according to necessity. Information received from the ground station includes service information of a route on which the train is traveling and neighboring routes (whether a service as scheduled is performed, detailed information in the case of disorder of the schedule, etc.), and news. Information transmitted to the ground station is, for example, information received from the train-information management device 3. When the communication device 1 receives information from the ground station, the communication device 1 outputs the information to the central device 2.

(Central Device 2)

When the central device 2 receives information received by the communication device 1 from the ground station, the central device 2 delivers the information to the own car (the car #1) and the terminal devices 4 of the cars. The central device 2 retains in advance, for example, information concerning a video to be displayed on the display devices 5B for advertisement display set in the cars. The central device 2 delivers the retained information to the display devices 5B at predetermined timing. Note that the central device 2 transmits the information (the information received from the communication device 1 and the retained information) to the terminal device 4 of the own car first. The terminal device 4, which receives the information transmitted from the central device 2, transfers the received information to the other terminal devices 4.

(Train-Information Management Device 3)

The train-information management device 3 collects information from devices mounted on the cars, for example, doors, air conditioners, brakes, motors, ATOs (automatic train operation devices), SIVs (stationary inverters functioning as auxiliary power supplies), and automatic broadcast devices and manages the information concerning the devices as train information. The train-information management device 3 transmits all or a part of the managed train information to the terminal devices 4 according to necessity. For example, when the train-information management device 3 receives a request from the terminal device 4, the train-information management device 3 transmits information indicated by request content to the requesting terminal device 4. When the train-information management device 3 receives information with high emergency that needs to be immediately provided to the passengers, the train-information management device 3 immediately transmits the information to the terminal device 4.

(Terminal Device 4)

Figure 5:
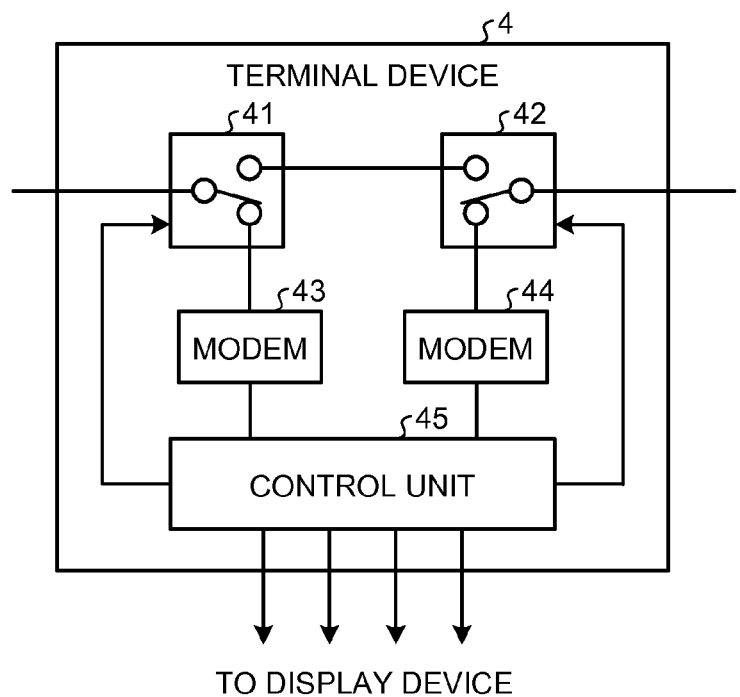
FIG. 5 is a diagram of a configuration example of the terminal device.

FIG. 5 is a diagram of a configuration example of the terminal device 4. As shown in the figure, the terminal device 4 includes route switching units 41 and 42, modems 43 and 44, and a control unit 45.

The route switching units 41 and 42 switch, according to an instruction from the control unit 45, a transmission route of various kinds of information received from the central device 2 directly or through the other terminal devices 4. The modems 43 and 44 perform modulation and demodulation of information transmitted and received between the terminal device 4 and the central device 2 or the other terminal devices 4.

The control unit 45 transfers the various kinds of information received from the central device 2 directly or through the other terminal devices 4 to the display devices 5 and the adjacent other terminal devices 4 and delivers the information to the display devices 5 in the own car. The control unit 45 generates, according to necessity, on the basis of train information acquired from the train-information management device 3, control information for instructing content to be displayed on the display devices 5, display timing, and the like and transmits the control information to the display device 5 to be controlled. The control unit 45 monitors the operation of the modems 43 and 44. When occurrence of a failure of the modems is detected, the control unit 45 cannot correctly demodulate and transmit received information from the central device 2 (the control unit 45 cannot cause the display devices 5 in the car to perform display using the information received from the central device 2. The control unit 45 cannot transmit the information downstream). Therefore, the control unit 45 controls the route switching units 41 and 42 and directly connects the route switching units 41 and 42. Consequently, the information received from the central device 2 is bypassed. It is possible to prevent the influence of the model failure from affecting the other cars. That is, it is possible to prevent a situation in which data after passage through the broken-down modems is transferred to the other cars and, in the cars that receive the data, information provision to the passengers is not normally performed, although the terminal devices 4 and the display devices 5 are not broken down.

(Display Device 5)

Figure 6:
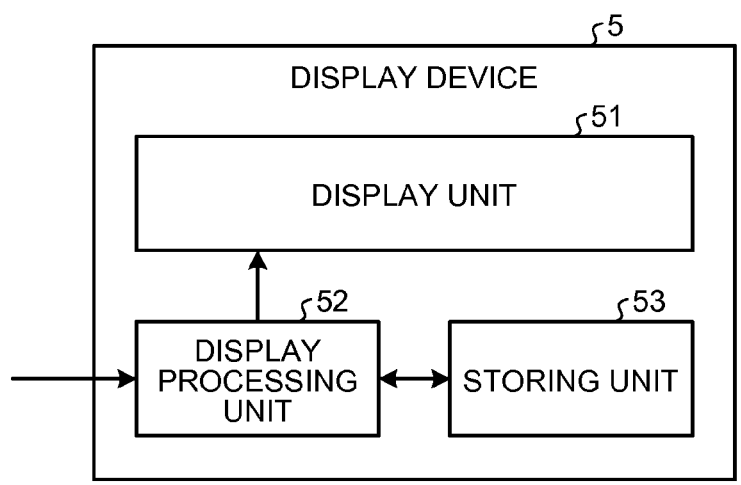
FIG. 6 is a diagram of a configuration example of the display device.

FIG. 6 is a diagram of a configuration example of the display device 5. As shown in the figure, the display device 5 includes a display unit 51 such as an LCD display panel, a display processing unit 52, and a storing unit 53.

The display unit 51 performs guidance display or advertisement display according to an instruction from the display processing unit 52. When the own display device is the display device 5A for guidance display, the display processing unit 52 generates, on the basis of instruction content (control information) received from the terminal device 4 and information for guidance display received from the terminal device 4 and retained in the storing unit 53, data of a guidance display screen to be displayed on the display unit 51. On the other hand, when the own display device is the display device 5A for advertisement display, the display processing unit 52 generates, on the basis of information for advertisement display such as video information received from the terminal device 4, data of an advertisement display screen to be displayed on the display unit 51. The display processing unit 52 is realized by hardware such as a CPU and predetermined software that cooperates with the hardware.

The storing unit 53 stores the information for guidance display received from the terminal device 4, information (e.g., an image, a moving image, or a text to be displayed on the guidance display screen), and the like. The storing unit 53 includes a memory area (a work area) temporarily used in video processing or the like by the display processing unit 52. The storing unit 53 can be realized by combining a RAM and a ROM. The storing unit 53 can include an interface for connecting a detachable external memory (external storage device) such that the external memory is connected to increase a capacity according to necessity. In this case, an external memory in which the information for guidance display and the information for advertisement display are written in advance is connected to the display device 5. Guidance display and advertisement display can be performed using information stored in the external memory. External memories in which different kinds of information are respectively written are connected to the display devices 5, whereby it is possible to perform guidance display and advertisement display of different contents for each of the display devices 5. Further, even when information is not delivered from the terminal device 4 because of failure occurrence in the terminal device 4, failure occurrence in the information transmission route, or the like, it is possible to perform guidance display (e.g., indicating that a reception failure of information occurs) or the like using the information retained by the storing units 53. Further, it is possible to collectively rewrite or rewrite, for each of the display devices, information in the external memories from the ground side through the communication device 1 or using data stored in the central device 2.

<Explanation of a Display Control Operation in the Cars>

Figure 7:
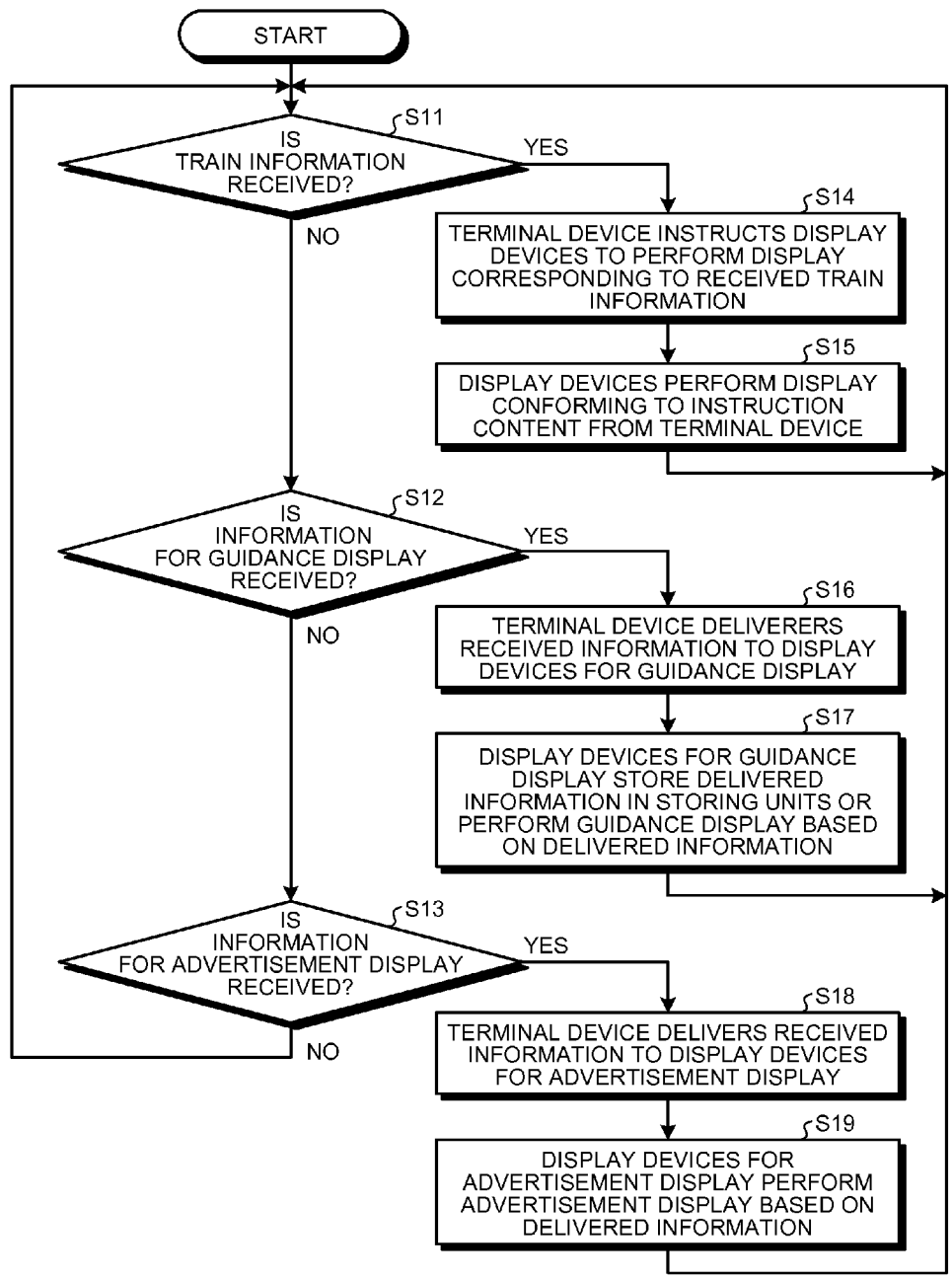
FIG. 7 is a flowchart for explaining an example of the operations of the terminal device and the display devices in each of cars.

The operation of the display devices 5 set in the cars in performing guidance display or advertisement display is explained with reference to FIG. 7. Note that FIG. 7 is a flowchart for explaining an example of the operations of the terminal device 4 and the display devices 5 of each of the cars.

In the cars, the terminal device 4 monitors whether train information is transmitted from the train-information management device 3 and monitors whether information for guidance display and information for advertisement display are transmitted from the central device 2 (steps S11, S12, and S13).

As a result of the monitoring operation at steps S11 to S13, when the train information is transmitted (Yes at step S11), the terminal device 4 generates instruction information (control information) for causing the display devices 5 to perform display corresponding to the received train information and transmits the instruction information to the display devices 5 (step S14).

For example, when information concerning the present position of the train is acquired as the train information, the terminal device 4 determines whether it is necessary to change display content on the display devices 5 while linking the display content to a position indicated by the acquired information. When it is necessary to change the display content, the terminal device 4 generates control information for instructing the change and transmits the control information to the display devices 5 corresponding to the change. If an advertisement to be displayed while being linked to the present position is present, the terminal device 4 generates control information indicating content of the advertisement to be displayed and transmits the control information to the display devices 5B for advertisement display. If control for, for example, causing the display devices 5 to display guidance of the present traveling position while linking the guidance to the present position or causing the display devices 5 to display arrival guidance to the next stop is necessary, the terminal device 4 generates control information indicating content of the guidance to be displayed and transmits the control information to the display devices 5A for guidance display. The display devices 5 perform display of content conforming to instruction content from the terminal device 4 (step S15). Note that, as explained below, when each of the display devices 5 recognizes a use of the own device (for guidance display or for advertisement display), the terminal device 4 can directly deliver the received train information to all the display devices 5.

When the information for guidance display is transmitted (Yes at step S12), the terminal device 4 delivers the received information for guidance display to the display devices 5A for guidance display (step S16). The display devices 5A store the delivered information for guidance display in the storing units 53 or perform guidance display based on the delivered information (step S17). Specifically, when the delivered information for guidance display is information used in normal guidance display without high emergency (e.g., route information), the display devices 5A retain the received information in the storing units 53. In this case, if latest information (information with updated content) of information retained up to that point is received, the display devices 5A update the retained old information to the latest information (overwrite the old information with the latest information). On the other hand, when information for guidance display with high emergency (e.g., information indicating occurrence of an earthquake, an accident, a failure, or the like) is transmitted, the display devices 5A perform emergency guidance display based on the information.

When the information for advertisement display is transmitted (Yes at step S13), the terminal device 4 delivers the received information for advertisement display to the display devices 5B for advertisement display (step S18). The display devices 5B perform advertisement display based on the delivered information for advertisement display (step S19). For example, when video information is transmitted as the information for advertisement display, the display devices 5B decode the received video information and reproduce a video (moving image content).

Note that, in this embodiment, the operation is explained in which the terminal device 4 checks a type of information delivered to the display devices 5, allocates the information to the display devices 5A for guidance display and the display devices 5B for advertisement display, and generates control information for instructing content to be displayed, display timing, and the like and transmits the control information to the display devices 5. However, the roles of the terminal device 4 can be only transfer of information to the other terminal devices 4 and delivery to the display devices in the car. That is, the terminal device 4 can deliver information received from the central device 2 and the train-information management device 3 to all the display devices 5 (deliver the same information to all the display devices 5 without distinguishing uses of the display devices). The display devices 5 can sort out necessary information according to a use (for guidance display or for advertisement display) of the own devices and perform the guidance display or the advertisement display. For example, information indicating a use is written in specific areas of the storing units 53, whereby the display devices 5 can recognize uses of the own devices.

Because the display devices 5 include the display processing units 52 and the storing units 53, an operation explained below is also possible. That is, the display devices 5 retain information concerning setting positions of the own devices (in which places in the car the display devices 5 are set) in the storing units 53. In the information delivered from the terminal device 4, setting position information indicating to which setting positions of the display devices 5 the information is delivered is included. The terminal device 4 delivers the same information to all the display devices 5. When the display devices 5 receive the information delivered from the terminal device 4, the display devices 5 check the setting position information included in the information and determine whether the setting position information is information treated in the own devices. When determining that the setting position information is information treated by the own devices, the display devices 5 perform guidance display or advertisement display using the information. With this operation, it is possible to perform guidance display and advertisement display with different content for each of the display devices 5.

In this way, the in-car information display system in this embodiment includes the terminal device set in each car of the train and a plurality of display devices that perform guidance display or advertisement display according to instructions from the terminal device. The terminal devices and a part of the display devices, which perform guidance display, operate by receiving power supply from the power storage device in the train. Further, the display devices, which operate by receiving the power supply from the power storage device in the train, directly receive information necessary for performing the guidance display from the terminal devices or receive the information through only the other display devices, which operate by receiving the power supply from the power storage device in the train. Consequently, for example, even when power supply from the overhead wire is stopped by a power failure or the like, when the current collector breaks down, when the power converter, which converts electric power supplied from the overhead wire into electric power for a display device operation, breaks down, it is possible to continue the guidance display by using a part of the display devices and provide the passengers with emergency guidance display. By performing the emergency guidance display using the display devices, even when emergency guidance by broadcast (sound) is hard to hear, it is highly likely that the passengers can grasp the situation by looking at guidance by an image (a picture) or characters. Further, it is possible to provide passengers having hearing difficulties with accurate information.

Because each display device retains the information for guidance display in advance, the display device can accurately display guidance during emergency without a delay. Further, it is possible to retain different information (information for guidance display) for each of the display devices. Therefore, for example, it is possible to cause the display devices to display guidance of content corresponding to setting positions of the display devices. It is likely that, for example, display of an evacuation route in escaping to the outside of a car is different even in the same car. Therefore, it is possible to provide accurate guidance corresponding to the positions of the passengers.

Note that, in this embodiment, the configuration in which the display devices for guidance display and the display devices for advertisement display are set in pairs is explained as an example. However, the present invention is also applicable to a case where the guidance display and the advertisement display are performed by one display device. In this case, as in the embodiment, a part of the display devices only have to be configured to be actuated with the supplied power from the power storage device and directly receive information from the terminal devices. In the embodiment, the train of a formation in which a plurality of cars is coupled is explained. However, the present invention is also applicable to a train of a one-car formation.

Second Embodiment

An in-car information display system in a second embodiment is explained. The overall configuration of the system and a power supply route to the terminal device 4 and the display devices 5 in one car are the same as those in the first embodiment (see FIGS. 1 to 4). The in-car information display system in this embodiment has a characteristic in the operation of the power storage device 8 for supplying electric power to the display devices 5A for guidance display. Note that, in the first embodiment, a part of the display devices 5A operate by receiving the supply of the direct-current power. However, all the display devices 5A can operate by receiving the supply of the direct-current power.

Figure 8:
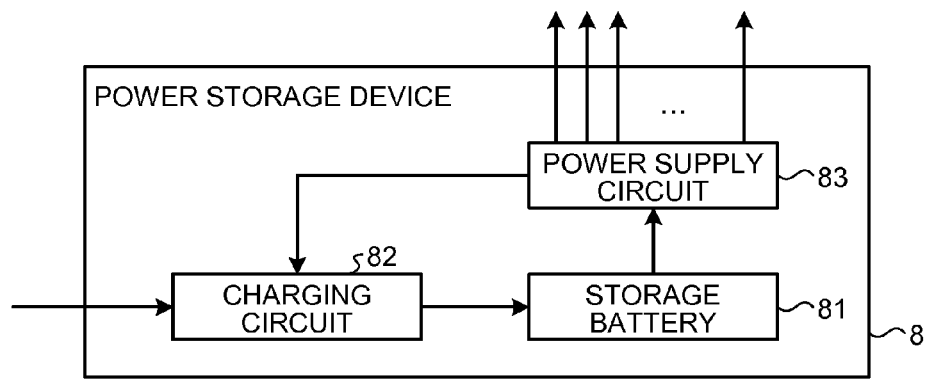
FIG. 8 is a diagram of a configuration example of a power storage device.

FIG. 8 is a diagram of a configuration example of the power storage device 8. As shown in the figure, the power storage device 8 includes a storage battery 81, a charging circuit 82 that, for example, converts a direct-current voltage supplied from the power converter 7 to generate a charging voltage of the storage battery 81, and a power supply circuit 83 that supplies electric power output from the storage battery 81 to the display device 5A for guidance display.

Figure 9:
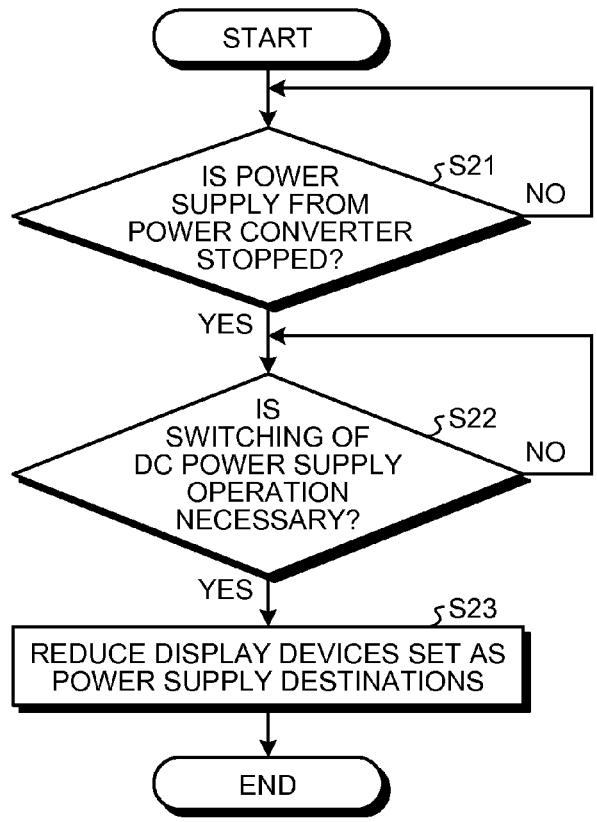
FIG. 9 is a flowchart for explaining an operation example of the power storage device.

FIG. 9 is a flowchart for explaining an operation example of the power storage device 8. The power storage device 8 monitors whether the power supply from the power converter 7 is stopped (step S21). When detecting the stop of the power supply (step S21), the power storage device 8 checks necessity of switching of a power supply operation to the display devices 5A (step S22). The power storage device 8 determines the necessity of the switching on the basis of the residual capacity of the storage battery 81. When determining as a result of the check that the switching is unnecessary (No at step S21), the power storage device 8 checks the necessity of the switching again at predetermined timing. When determining that the switching is necessary (Yes at step S22), the power storage device 8 reduces the display device 5A set as power supply destinations (step S23). Note that it is also possible that step S21 is omitted and the power storage device 8 always checks the necessity of the switching of the power supply operation to the display devices 5A irrespective of a power supply state from the power converter 7.

At step S21, for example, the power supply circuit 83 monitors an input voltage to the charging circuit 82, an output voltage from the charging circuit 82, and the operation of the charging circuit 82 to thereby determine whether power supply from the power converter 7 is stopped.

At step S22, for example, the power supply circuit 83 estimates a residual capacity on the basis of an output voltage from the storage battery 81 and, if the estimated residual capacity is equal to or smaller than a fixed value, determines that the switching of the power supply operation is necessary. The estimation of the residual capacity can be performed on the basis of the capacity of the storage battery 81 and power consumption in the display devices 5A. The power supply circuit 83 can determine, without estimating the residual capacity, on the basis of an elapsed time from a stop of the power supply from the power converter 7, whether the switching of the power supply operation is necessary. When determining on the basis of the elapsed time whether the switching of the power supply operation is necessary, it is desirable to make it possible to indirectly grasp the residual capacity by, for example, creating and retaining in advance a table showing a relation between the elapsed time from the stop of the power supply from the power converter 7 and the residual amount of the storage battery 81.

At step S23, for example, the power supply circuit 83 stops supply of electric power to a part of the display devices 5A. Consequently, it is possible to suppress power consumption in the entire system and extend the duration of the guidance display. Note that the display devices set as power supply destinations can be switched at a fixed time interval. For example, when the display devices 5A are set on the wall surfaces of the car, first, the power supply circuit 83 supplies electric power to only the display devices 5A set on the wall surface on the right side and, thereafter, supplies electric power to only the display devices 5A set on the wall surface on the left side at a point when a fixed time elapses. Thereafter, the power supply circuit 83 switches the power supply destinations every time the fixed time elapses. When such control is performed, it is possible to suppress power consumption while maintaining a state in which a larger number of passengers can check the guidance display. It is possible to extend the duration of the guidance display. As another control, the guidance display can be stopped once by stopping the power supply to all the display devices 5A and performed again at a point when the fixed time elapses. That is, the power consumption can be suppressed by providing a period in which display is not performed rather than always performing the guidance display. Note that, when a problem occurs in that, for example, it takes time to perform display again after the power supply to the display devices 5A is stopped, the power supply circuit 83 only has to maintain the power supply to the display devices 5A and instruct the display devices 5A to suspend the guidance display.

As still another control, the power supply circuit 83 can instruct each of the display devices 5A, which operate by receiving the supply of the direct-current power, to reduce the luminance of backlights and suppress power consumption. When the luminance is reduced, it is possible to suppress the power consumption while maintaining the state in which a larger number of passengers can check the guidance display. It is possible to extend the duration of the guidance display. Note that, when the power supply from the power converter 7 is stopped, it is highly likely that the supply of the alternating-current power from the power converter 7 to lighting devices in the cars is also stopped. Therefore, at a point when the power supply circuit 83 detects the stop of the power supply, the power supply circuit 83 can instruct the display devices 5A to reduce the luminance of the backlights. Thereafter, the power supply circuit 83 can further reduce the luminance according to an elapsed time from the detection of the residual capacity of the storage battery 81 and the power supply stop.

To simplify the explanation, in FIG. 9, the operation ends after the processing at step S23 is performed. However, after executing step S23, the power supply circuit 83 can return to step S22 and determine whether the switching of the power supply operation is further necessary. That is, the power supply destinations can be gradually reduced or the luminance of the backlights can be gradually reduced according to, for example, the residual capacity of the storage battery 81. When the power supply destinations are gradually reduced, priority can be set for the display devices 5A. The power supply can be stopped in order from the display devices 5A having the lowest priority. For example, it is conceivable to set the priority higher for the display devices 5A closer to the center of the car or set the priority higher for the display devices 5A closer to a priority seat.

The control for reducing the luminance of the backlights and the control for reducing the display devices 5A set as power supply destinations can be concurrently used. For example, when the stop of the power supply from the power converter 7 is detected, first, the control for reducing the luminance of the backlights according to the residual capacity or the like is performed. After the luminance of the backlights is reduced to a lowest level, the display devices 5A set as the power supply destinations are gradually reduced.

In this way, in the in-car information display system in this embodiment, the power storage device 8 switches the power supply operation, for example, reduces the display devices 5A set as supply destinations of the direct-current power or reduces the luminance of the backlights of the display devices 5A according to the residual capacity of the storage battery. Consequently, effects same as the effects in the first embodiment are obtained. It is possible to suppress electric power consumed by the display devices 5A and continue the guidance display for a long time.

INDUSTRIAL APPLICABILITY

As explained above, the present invention is useful as the in-car information display system that performs the guidance display and the advertisement display in the car.

REFERENCE SIGNS LIST

1 Communication device
2 Central device (Delivery server)
3 Train-information management device
4 Terminal device
$5A_{11}$ to $5A_{14}$, $5A_{1K}$, $5A_{21}$ to $5A_{24}$, $5A_{2K}$ Display devices (for guidance display)
$5B_{11}$ to $5B_{14}$, $5B_{1K}$, $5B_{21}$ to $5B_{24}$, $5B_{2K}$ Display devices (for advertisement display)
6 Current collector
7 Power converter
8 Power storage device
41, 42 Route switching units
43, 44 Modems
45 Control unit
51 Display unit
52 Display processing unit
53 Storing unit
81 Storage battery
82 Charging circuit
83 Power supply circuit

The invention claimed is:

1. An in-car information display system comprising:
   a power storage device including a storage battery charged with direct-current power obtained by converting electric power from an overhead wire;
   a plurality of display devices that operate by receiving supply of direct-current power from the power storage device and provide a guidance display related to a service of a train to passengers; and
   a terminal device that operates by receiving the supply of the direct-current power from the power storage device and delivers to the display devices information for guidance display that is information used for the guidance display,
   wherein the power storage device switches a power supply operation to the display devices according to a residual capacity of the storage battery and reduces a total amount of electric power supplied to each of the display devices and wherein, when the residual capacity is equal to or smaller than a predetermined threshold, the power storage device stops power supply to a part of the display devices.

2. The in-car information display system according to claim 1, wherein the power storage device selects and uses a plurality of thresholds in decreasing order, and, when the residual capacity is equal to or smaller than the selected threshold, stops power supply to a part of the display devices among the display devices to which the electric power is supplied up to that point and changes the threshold in use.

3. The in-car information display system according to claim 2,
   wherein each of the display devices includes priority determined on the basis of a setting position thereof, and
   wherein, every time the residual capacity is equal to or smaller than the selected threshold, the power storage device stops the power supply in ascending order of priority.

4. The in-car information display system according to claim 1, wherein, when the residual capacity is equal to or smaller than a predetermined threshold, the power storage device starts a power supply operation for switching, at a fixed cycle, the display device set as a power supply destination.

5. The in-car information display system according to claim 1, wherein, when the residual capacity is equal to or smaller than a predetermined threshold, the power storage device instructs each display device to reduce luminance of backlights.

6. The in-car information display system according to claim 1, wherein the power storage device selects and uses a plurality of thresholds in decreasing order, and instructs, when the residual capacity is equal to or smaller than the selected threshold, each display device to reduce luminance of backlights and change the threshold in use.

7. The in-car information display system according to claim 1, wherein the power storage device selects and uses a plurality of thresholds in decreasing order, instructs, when the residual capacity is equal to or smaller than the selected threshold, each display device to reduce luminance of backlights and change the threshold in use, and stops, when detecting that the residual capacity is equal to or smaller than the selected threshold after the luminance of the backlights is reduced to a lowest value, power supply to a part of the display devices among the display devices to which the electric power is supplied up to that point and changes the threshold in use.

8. The in-car information display system according to claim 1, wherein the residual capacity is an estimated residual capacity estimated on the basis of an output voltage of the storage battery.

9. The in-car information display system according to claim 1, wherein the residual capacity is an estimated residual capacity estimated on the basis of an elapsed time from a stop of supply of the direct-current power obtained by converting the electric power from the overhead wire.

10. A power supply method for a car including a power storage device having a storage battery charged with direct-current power obtained by converting electric power from an overhead wire, a plurality of display devices that operate by receiving supply of direct-current power from the power storage device and provide a guidance display related to a service of a train to passengers, and a terminal device that operates by receiving the supply of the direct-current power from the power storage device and delivers to the display devices information for guidance display that is information used for the guidance display, the power supply method comprising:
   switching a power supply operation to the display devices by the power storage device according to a residual capacity of the storage battery; and
   reducing a total amount of electric power supplied to each display device, wherein, when the residual capacity is equal to or smaller than a predetermined threshold, the power storage device stops power supply to a part of the display devices.

11. The power supply method according to claim 10, wherein the power storage device selects and uses a plurality of thresholds in decreasing order, and, when the residual capacity is equal to or smaller than the selected threshold, stops power supply to a part of the display devices among the display devices to which the electric power is supplied up to that point and changes the threshold in use.

12. The power supply method according to claim 11,
    wherein each of the display devices includes priority determined on the basis of a setting position thereof, and
    wherein, every time the residual capacity is equal to or smaller than the selected threshold, the power storage device stops the power supply in ascending order of priority.

13. The power supply method according to claim 10, wherein, when the residual capacity is equal to or smaller than a predetermined threshold, the power storage device starts a power supply operation for switching, at a fixed cycle, the display device set as a power supply destination.

14. The power supply method according to claim 10, wherein, when the residual capacity is equal to or smaller than a predetermined threshold, the power storage device instructs each display device to reduce luminance of backlights.

15. The power supply method according to claim 10, wherein the power storage device selects and uses a plurality of thresholds in decreasing order, and instructs, when the residual capacity is equal to or smaller than the selected threshold, each display device to reduce luminance of backlights and change the threshold in use.

16. The power supply method according to claim 10, wherein the power storage device selects and uses a plurality of thresholds in decreasing order, instructs, when the residual capacity is equal to or smaller than the selected threshold, each display device to reduce luminance of backlights and change the threshold in use, and stops, when detecting that the residual capacity is equal to or smaller than the selected threshold after the luminance of the backlights is reduced to a lowest value, power supply to a part of the display devices among the display devices to which the electric power is supplied up to that point and changes the threshold in use.

17. The power supply method according to claim 10, wherein the residual capacity is an estimated residual capacity estimated on the basis of an output voltage of the storage battery.

18. The power supply method according to claim 10, wherein the residual capacity is an estimated residual capacity estimated on the basis of an elapsed time from a stop of supply of the direct-current power obtained by converting the electric power from the overhead wire.

* * * * *